(12) United States Patent
Lahiri

(10) Patent No.: US 7,791,485 B2
(45) Date of Patent: Sep. 7, 2010

(54) DECOMMISSIONING BIN FOR AUTOMATIC DECOMMISSIONING OF ELECTRONIC TAGS

(75) Inventor: Sandip Lahiri, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 11/842,987

(22) Filed: Aug. 22, 2007

(65) Prior Publication Data

US 2009/0051536 A1 Feb. 26, 2009

(51) Int. Cl.
G08B 13/14 (2006.01)
(52) U.S. Cl. .................. 340/572.3; 340/572.1; 340/5.9; 340/5.92; 340/10.1
(58) Field of Classification Search .................. 340/5.9, 340/5.92, 572.1–572.9; 235/385; 700/236; 705/28, 29
See application file for complete search history.

(56) References Cited

U.S. PATENT DOCUMENTS

| 5,971,587 | A | * | 10/1999 | Kato et al. ................. 700/115 |
| 6,025,780 | A | * | 2/2000 | Bowers et al. ........... 340/572.3 |
| 6,154,135 | A | * | 11/2000 | Kane et al. ............... 340/572.3 |
| 6,809,645 | B1 | * | 10/2004 | Mason ..................... 340/572.1 |
| 7,109,866 | B2 | * | 9/2006 | Maitin et al. ............. 340/572.3 |
| 2005/0190060 | A1 | * | 9/2005 | Clancy et al. ............ 340/572.9 |
| 2006/0087436 | A1 | | 4/2006 | Reddy et al. |
| 2006/0187047 | A1 | * | 8/2006 | Iwakata et al. ........... 340/572.3 |
| 2007/0143190 | A1 | * | 6/2007 | Banerjee et al. ............... 705/26 |

* cited by examiner

*Primary Examiner*—Daniel Wu
*Assistant Examiner*—Ryan W Sherwin
(74) *Attorney, Agent, or Firm*—Jeanine S. Ray-Yarletts, Esq.; Steven M. Greenberg, Esq.; Carey Rodriguez Greenberg & Paul LLP

(57) ABSTRACT

Embodiments of the present invention address deficiencies of the art in respect to electronic tag decommissioning and provide a method, system and computer program product for electronic tag decommissioning. In one embodiment of the invention, an electronic tag decommissioning system can be provided. The system can include a database housing link data associating a plurality of electronic tags with respective objects, and a decommissioning bin. The decommissioning bin can include an electronic tag reader coupled to decommissioning logic programmed to decommission the electronic tag in the database.

13 Claims, 2 Drawing Sheets

DECOMMISSIONING BIN FOR AUTOMATIC DECOMMISSIONING OF ELECTRONIC TAGS

BACKGROUND OF THE INVENTION

1. Field of the Invention

The present invention relates to electronic article surveillance (EAS) and more particularly to electronic tag decommissioning.

2. Description of the Related Art

Electronic tag identification like the identification of radio frequency identification (RFID) tags is an area of automatic identification and electronic article surveillance that has quietly been gaining momentum in recent years and is now being seen as a radical means of enhancing data handling processes, complimentary in many ways to other data capture technologies such bar coding. The object of any RFID system is to carry data in suitable transponders, generally known as tags, and to retrieve data, by machine-readable means, at a suitable time and place to satisfy particular application needs. Data within a tag may provide identification for an item in manufacture, goods in transit, the location of an item, the identity of a vehicle, an animal or individual. By including additional data the prospect is provided for supporting applications through item specific information or instructions immediately available on reading the tag.

An RFID object tracking system requires, in addition to RFID tags, a means of reading or interrogating the tags and some means of communicating the data to a host computer or information management system. In this respect, an RFID object tracking system also can include a facility for programming data into the tags. Notably, the tags can be active and powered in nature, or passive and unpowered in nature. Communication of data between tags and a reader can be by wireless communication. Two methods distinguish and categorize RFID object tracking systems, one based upon close proximity electromagnetic or inductive coupling and one based upon propagating electromagnetic waves. Coupling is via 'antenna' structures forming an integral feature in both tags and readers. While the term antenna is generally considered more appropriate for propagating systems it is also loosely applied to inductive systems.

RFID systems can be roughly grouped into four categories: EAS systems, portable data capture systems, networked systems and positioning systems. EAS systems typically involve a one bit system used to sense the presence or absence of an item. Portable data capture systems, by comparison, can be characterized by the use of portable data terminals with integral RFID readers and can be used in applications where a high degree of variability in sourcing required data from tagged items may be exhibited. Networked systems applications can generally be characterized by fixed position readers deployed within a given site and connected directly to a networked information management system. The transponders are positioned on moving or moveable items, or people, depending upon application. Finally, positioning systems use transponders to facilitate automated location and navigation support for guided vehicles.

Potential applications for RFID may be identified in virtually every sector of industry, commerce and services where data is to be collected. The attributes of RFID are complimentary to other data capture technologies and thus able to satisfy particular application requirements that cannot be adequately accommodate by alternative technologies. Principal areas of application for RFID that can be currently identified include: transportation and logistics, manufacturing and processing, and security. A range of miscellaneous applications further can be distinguished, including animal tagging, waste management, time and attendance, postal tracking, airline baggage reconciliation, and road toll management.

Despite many of the apparent advantages of RFID technology, standards in industry to protect the privacy of customers and individuals are not yet clearly defined. There is a concern that any individual with a transmitter, not just the manufacturer, may be able to activate and detect a dormant RFID tag. For instance, counterfeiting, theft and product recalls present considerable risks for drug producers, distributors and pharmacies as drugs move from production to consumers. Additionally, after being discarded into the trash by a consumer, an RFID tag may be used to track consumer behavior.

A variety of manual schemes are used today in order to "kill" an RFID tag in order to preserve consumer privacy, such as personnel manually scanning collected RFID tags to decommission it. The collected RFID tags usually need to be brought to a central station to get decommissioned. Besides physically detaching the tag from the associated object, these schemes add an additional step, thus increasing the operations costs and decreasing operational efficiency.

Another drawback of current manual schemes result in the personnel who decommission the RFID tag not necessarily being the same personnel who physically remove the RFID tag from the tagged object. However, the personnel decommissioning usually need to use an RFID reader which is typically located away from the operational area where the personnel physically removing an RFID tag operates. Thus, this could lead to a situation where an RFID tag may still be associated with the original detached object but associated with a new object as well, causing an incorrect ePedigree in the RFID system. Therefore, current schemes require additional manual labor to detach and decommission which result in additional steps.

BRIEF SUMMARY OF THE INVENTION

Embodiments of the present invention address deficiencies of the art in respect to electronic tag decommissioning and provide a novel and non-obvious method, system and computer program product for electronic tag decommissioning. In one embodiment of the invention, the electronic tag decommissioning system can include a database housing link data associating a plurality of electronic tags with respective objects, and a decommissioning bin. The decommissioning bin can include an electronic tag reader coupled to decommissioning logic programmed to decommission the electronic tag in the database. The electronic tag can include, by way of example, an RFID tag.

In one aspect of the embodiment, the decommissioning bin can include an entry compartment, an exit compartment, a database having link data associating a plurality of electronic tags with respective articles or objects, and a decommissioning compartment in communication with both the entry compartment and the exit compartment. The decommissioning compartment can include an electronic tag reader coupled to decommissioning logic programmed to access the database to disassociate link data associating electronic tags recognized by the electronic tag reader from respective ones of the articles or objects. In another aspect of the embodiment, the entry compartment can include an entry chute, an entry chamber and an entry trap door. Similarly, the exit compartment can include an exit chute, an exit chamber and an exit trap door. Further, the decommissioning compartment can include a decommissioning chute, a decommissioning chamber, and a decommissioning trap door.

In another embodiment of the invention, an electronic tag decommissioning method can be provided. The method can include reading an electronic tag associated with a respective article, accessing a database of records each record associating an electronic tag with an article, locating a record in the database for the read electronic tag, and disassociating the read electronic tag from the article in the database. In one aspect of the embodiment, reading an electronic tag associated with an article can include reading an RFID tag associated with an article. In another aspect of the embodiment, disassociating the read electronic tag from the article in the database can include removing link data associating the read electronic tag with the article deleting the record outright.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for electronic tag decommissioning. In accordance with an embodiment of the present invention, an electronic tag associated with an object can be detached from the object and the detached tag can be tossed into a decommissioning bin. Subsequently, the electronic tag can be read and its record in a database can be located so that the association of the electronic tag record can be deactivated and disassociated from the object it was previously attached to.

Figure 1:
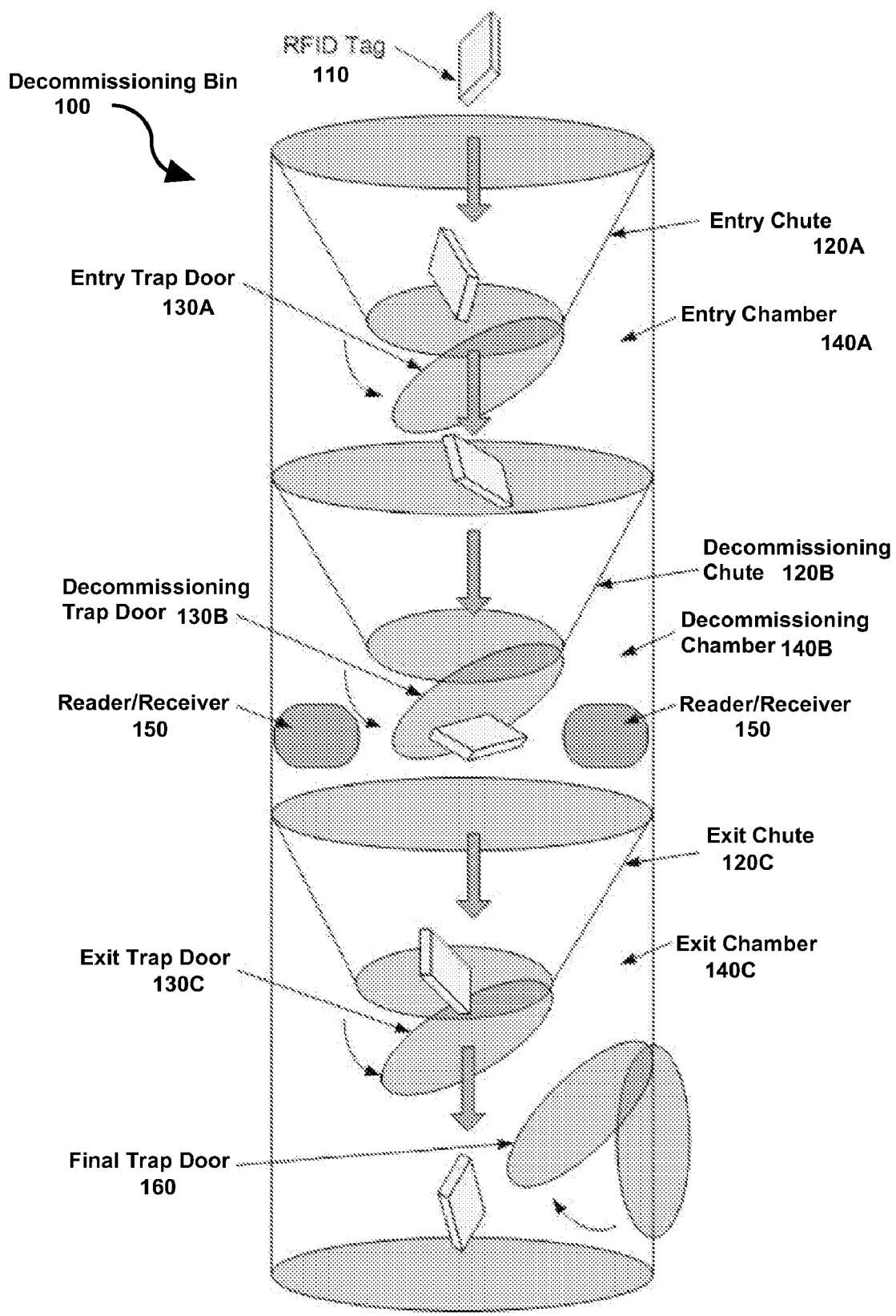
FIG. 1 is a pictorial illustration of a decommissioning bin configured to decommission an electronic tag.

In further illustration, FIG. 1 is a pictorial illustration of a decommissioning bin configured to decommission an electronic tag. A decommissioning bin 100 can be made of RF-opaque material of suitable thickness. When an electronic tag, such as an RFID tag 110 is detached from a tagged object or article, the RFID tag 110 can be tossed into the decommissioning bin 100. The components of the decommissioning bin 100 can include an entry compartment, an exit compartment, and a decommissioning compartment in communication with both the entry and exit compartments. The entry compartment can include an entry chute 120A that can be oriented vertically so that the narrow end of the chute can point down to facilitate automatic downward movement and prevent the RFID tag 110 from getting stuck in its path. The entry chute can be any geometrical shape, including a conical shape.

When the RFID tag 110 drops down into the entry chute 120A the RFID tag 110 subsequently can hit the entry tap door 130A. The entry chamber 140A can be a partition of the decommissioning bin 100 whose entry and exit points can be controlled by trap doors. The entry trap door 130A can control the entry and the decommissioning trap door 130B can control the exit of an RFID tag 110 from the entry chamber 140A. The entry trap door 130A can open inside the entry chamber 140A. When an RFID tag 110 hits the surface of the entry trap door 130A, this trap door can open and let the RFID tag enter into the entry chamber 140A. As soon as the RFID tag 110 enters into the entry chamber 140A, the entry trap door 130A can immediately close and let the RFID tag 110 be enclosed completely to preserve an RF-opaque environment.

Next, the RFID tag 110 can continue through and hit the decommissioning trap door 130B which allows the RFID tag to exit the entry chamber 140A and enter the decommissioning chamber 140B. The decommissioning chamber 140B can house one or more compatible RFID readers/receivers. The entry into the decommissioning chamber 140B can be controlled by the decommissioning trap door 130B and the exit out can be controlled by the exit trap door 130C which can open out into the exit chamber 140C. When the RFID tag 110 enters into the decommissioning chamber 140B, the decommissioning trap door 130B immediately closes.

While in the decommissioning chamber 140B, the RFID tag 110 is then scanned or read by either a passive reader antenna 150 or an active tag receiver 150 depending on whether the RFID tag is a passive or active RFID tag 110. The reader/receiver 150 can be enabled to have program code that decommissions the RFID tag 110. The RFID tag 110 record is then located wirelessly in a database/repository that houses RFID tag records and associated link data that associates a particular RFID tag with a particular object/article. Once the RFID record is located, the link data associating the RFID tag with a particular object/article is destroyed, so that the RFID tag is no longer associated or linked with that particular object anymore. In one aspect of the embodiment, the RFID record can be deleted.

Finally, the RFID tag can hit the exit trap door, thus exiting out from the decommissioning chamber 140B and into the exiting chamber 140C. The exiting chamber 140C can be used to collect the RFID tags that have been decommissioned. These decommissioned tags can then be extracted from the decommissioning bin by opening the final trap door 160 which can open outward. Thus, the RFID tag 110 can now be ready for reuse.

Notably, having multiple trap doors can create a RF-opaque environment for an electronic tag that has been dropped into the decommissioning bin 100 at its reading time. Thus, when an RFID tag enters the decommissioning chamber 140B, both the entry trap door 130A and the exit trap door 130C will always be closed. Regardless of whether the decommissioning trap door 130B is partially closed or the final trap door 160 is partially open (as personnel may open this to retrieve an RFID tag from the exit chamber), the combination of multiple trap doors create an RF-opaque environment so that the readers/receivers 150 located inside the decommissioning chamber 140B are not affected by other electronic tag interference in the vicinity located outside of the decommissioning chamber 140B.

Thus, it is certain that the reader/receiver is not capable of reading another RFID tag that is located outside the decommissioning chamber 140B. Additionally, the RFID tag can be decommissioned if the RFID tag read/scanned has the RFID reader/receiver location matching with the decommissioning bin location.

Figure 2:
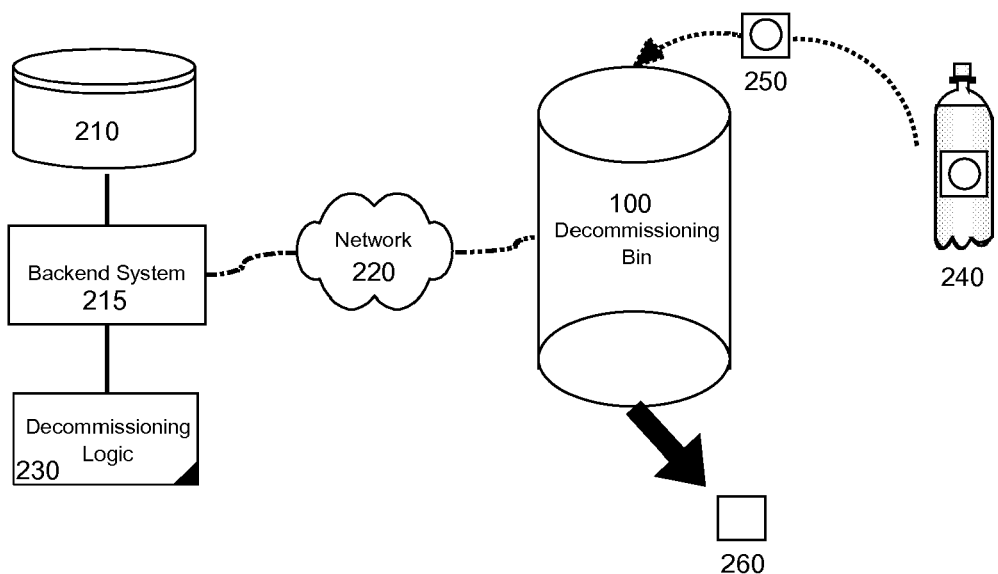
FIG. 2 is a schematic illustration of a decommissioning system configured for decommissioning an electronic tag.

The decommissioning of an electronic tag in a decommissioning bin described herein can be embodied within a collaborative computing environment. In illustration, FIG. 2 is a schematic illustration of a decommissioning system configured for decommissioning an electronic tag. The system can include a backend system 215 configured for communicative coupling to one or more decommissioning bins 100 over computer communications network 220. The backend system 215 receives the electronic tag reads from several readers in one or more decommissioning bin and determines based on the reader location (derived from reader ID) what logic to invoke. In this case, if the backend system 215 determines a bin reader from a tag ID it has received from this reader, it then invokes the decommissioning logic 230 that deletes the association information between the read tag ID and the associated item ID from the database 210.

The backend system 215 can be coupled to decommissioning logic 230. The database 210 can be coupled to decommissioning logic 230. The logic 230 can include program code enabled to receive an electronic tag 250 that has already been detached from a tagged article/object 240 and tossed into the decommissioning bin 100, determine whether it is an active or passive electronic tag, initiate responsive to determining whether it is an active or passive electronic tag an active tag receiver or passive tag reader respectively, locate the electronic tag record in the database, and disable the link associating the electronic tag with respective object.

Figure 3:
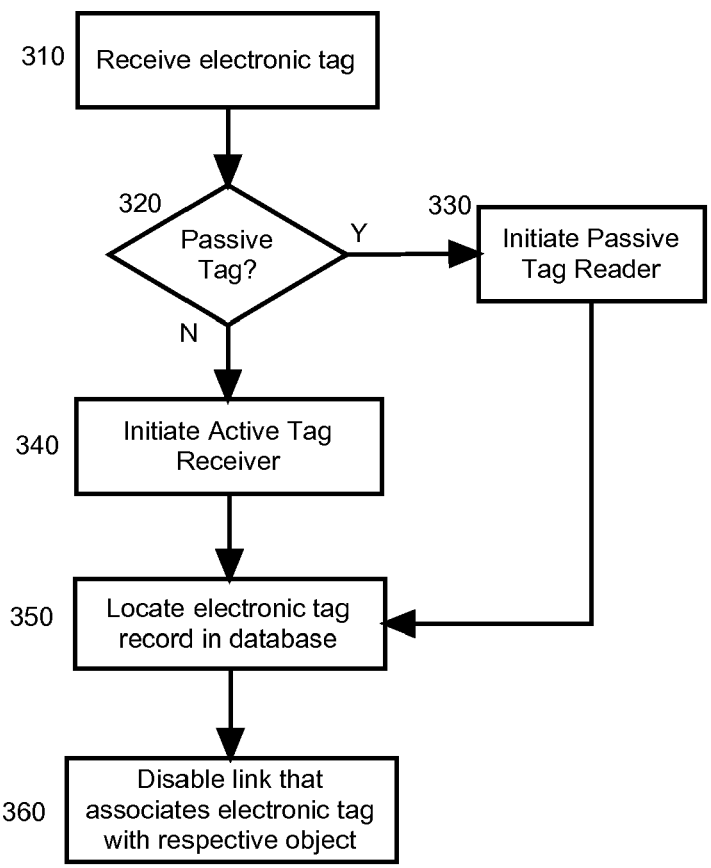
FIG. 3 is a flow chart illustrating a process for decommissioning an electronic tag.

In further illustration, FIG. 3 is a flow chart illustrating a process for decommissioning an electronic tag. Starting in block 310 an electronic tag can be received into the decommissioning bin. In decision block 320, if the electronic tag is a passive electronic tag, then block 330 can be implemented by initiating passive tag reader. If the electronic tag is an active electronic tag, then in block 340 active tag receiver can be initiated. Next, after reading/scanning the electronic tag, in block 350 the electronic tag record can be located in the database. After finding a match, in block 360 the electronic tag can record can be disabled by disassociating the link that associates the electronic tag with respective object in the database. Additionally, the RFID tag can be decommissioned if the RFID tag read/scanned has the RFID reader/receiver location matching with the decommissioning bin location.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. An electronic tag decommissioning system comprising:
a computer with at least one processor and memory;
a database coupled to the computer, the database comprising link data associating a plurality of electronic tags with respective objects;
decommissioning logic comprising program code executing in the memory of the computer by the at least one processor of the computer programmed to decommission individual ones of the electronic tags in the database; and,
a decommissioning bin, the decommissioning bin comprising:
an entry compartment;
an exit compartment;
an electronic tag reader coupled to the decommissioning logic and configured to direct decommissioning of read tags in the bin by the decommissioning logic; and,
a decommissioning compartment disposed between the entry and exit compartments, the decommissioning compartment comprising the electronic tag reader coupled to decommissioning logic programmed to decommission the electronic tag in the database.

2. The system of claim 1 wherein the entry compartment comprises an entry chute, an entry chamber and an entry trap door.

3. The system of claim 1 wherein the exit compartment comprises an exit chute, an exit chamber and an exit trap door.

4. The system of claim 1 wherein the decommissioning compartment comprises a decommissioning chute, a decommissioning chamber, and a decommissioning trap door.

5. The system of claim 1, wherein the electronic tag is a radio frequency identification (RFID) tag.

6. An electronic tag decommissioning method comprising:
detecting an electronic tag placed in a decommissioning compartment of a bin, wherein the decommissioning compartment is disposed between an entry compartment and an exit compartment;
reading the electronic tag;
accessing in a computer with at least one processor and memory, a database of records each record associating an electronic tag with an article;
locating a record in the database for the read electronic tag; and
disassociating the read electronic tag from a corresponding article in the database.

7. The method of claim 6, wherein reading the electronic tag, comprises reading a radio frequency identification (RFID) tag.

8. The method of claim 6, wherein disassociating the read electronic tag from a corresponding article in the database, comprises removing link data associating the read electronic tag with the article.

9. The method of claim 6, wherein disassociating the read electronic tag from a corresponding article in the database, comprises deleting the record.

10. A computer program product comprising a non-transitory computer usable medium embodying computer usable program code for electronic tag decommissioning, the computer program product comprising:

computer usable program code detecting an electronic tag placed in a decommissioning compartment of a bin, wherein the decommissioning compartment is disposed between an entry compartment and an exit compartment;

computer usable program code reading the electronic tag, computer usable program code accessing in a computer with at least one processor and memory, a database of records each record associating an electronic tag with an article;

computer usable program code locating a record in the database for the read electronic tag; and computer usable program code disassociating the read electronic tag from a corresponding article in the database.

11. The computer program product of claim 10, wherein the computer usable program code for reading the electronic tag, comprises computer usable program code for reading a radio frequency identification (RFID) tag.

12. The computer program product of claim 10, wherein the computer usable program code for disassociating the read electronic tag from a corresponding article in the database, comprises computer usable program code for removing link data associating the read electronic tag with the article.

13. The computer program product of claim 10, wherein the computer usable program code for disassociating the read electronic tag from a corresponding article in the database, comprises computer usable program code for deleting the record.

* * * * *